United States Patent [19]

Carmillet

[11] Patent Number: 4,577,740
[45] Date of Patent: Mar. 25, 1986

[54] CLUTCH COVER ASSEMBLY

[75] Inventor: Roger F. L. Carmillet, Paris, France

[73] Assignee: VALEO, Paris, France

[21] Appl. No.: 504,397

[22] Filed: Jun. 15, 1983

[30] Foreign Application Priority Data

Jun. 21, 1982 [FR] France .............................. 82 10785

[51] Int. Cl.⁴ ............................................ F16D 13/18
[52] U.S. Cl. ............................. 192/70.18; 192/109 R
[58] Field of Search ................ 192/70.18, 70.28, 89 B, 192/109 R

[56] References Cited

U.S. PATENT DOCUMENTS

| | | | |
|---|---|---|---|
| 2,201,340 | 5/1940 | Hunt | 192/70.28 |
| 2,277,557 | 3/1942 | Nutt | 192/70.18 X |
| 3,489,256 | 1/1970 | Binder et al. | 192/70.18 X |

FOREIGN PATENT DOCUMENTS 2658744  7/1978  Fed. Rep. of Germany .
2250919  6/1975  France .

*Primary Examiner*—Stephen F. Husar
*Attorney, Agent, or Firm*—Charles E. Brown; Charles A. Brown

[57] ABSTRACT

A clutch cover assembly comprises a pre-assembled combination of parts including a cover (10) which is fixed in the axial direction and a pressure plate (14) which is movable in the axial direction. A diaphragm spring (11) acts on the pressure plate (14). There are means to limit axial movement of the axially movable part and to retain this part radially. These means comprise a limiting member (50) having at least one inclined surface (44) and a retaining member (47) having at least one edge (49) disposed opposite the aforementioned inclined surface and adapted to immobilize the axially movable part in the storage position of the pre-assembled combination. By virtue of mutual interference, sufficient cohesion is conferred on the assembly to protect its drive straps (23) from damage while in storage.

32 Claims, 15 Drawing Figures

FIG.1
FIG.2
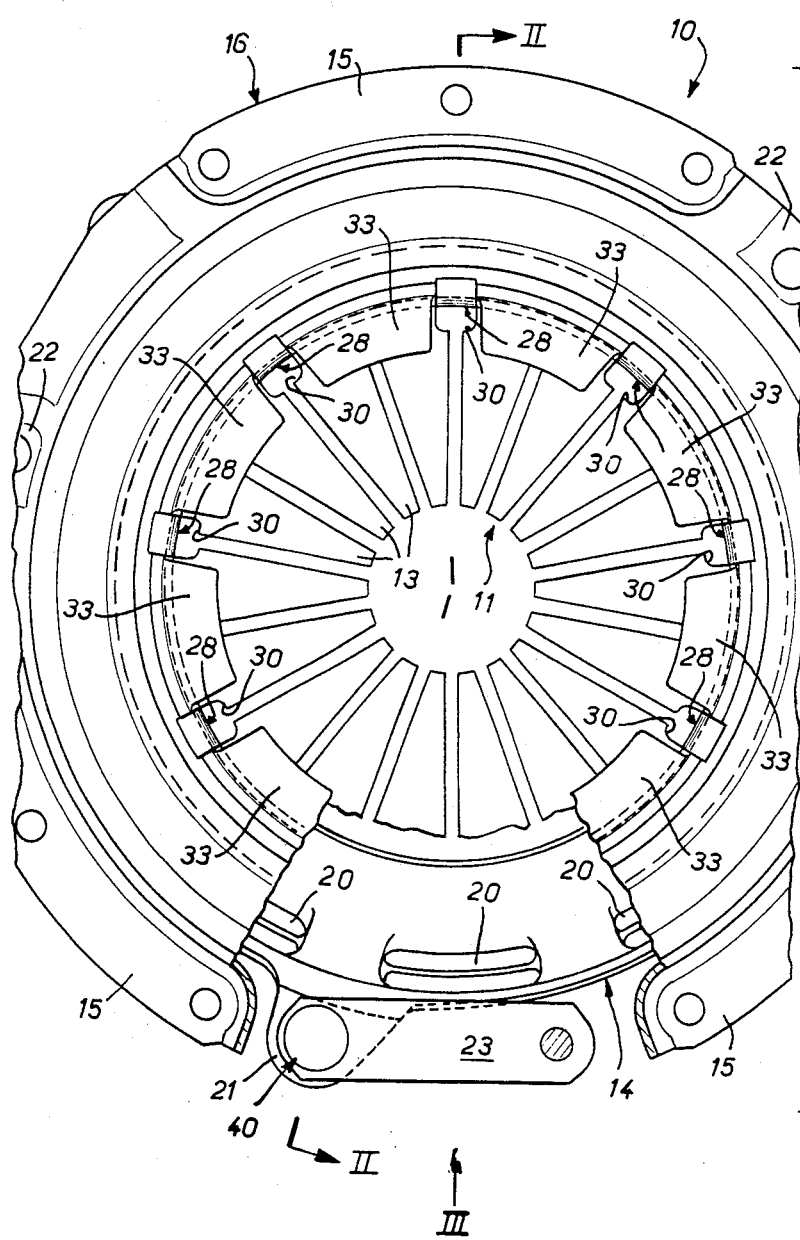
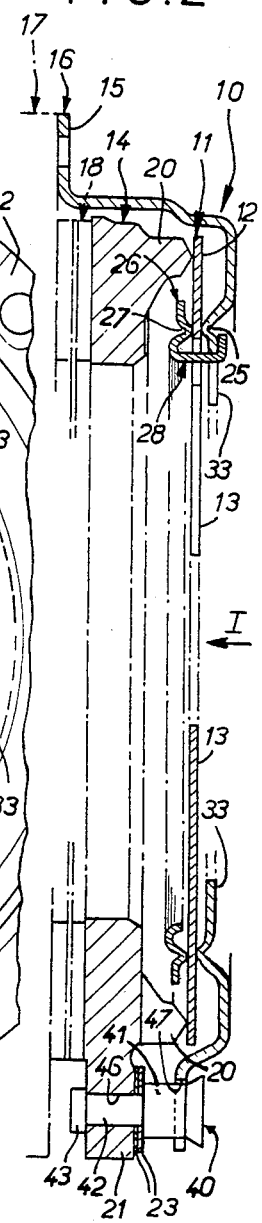

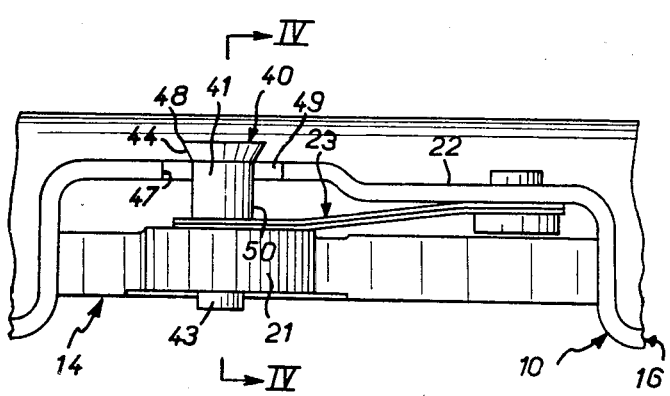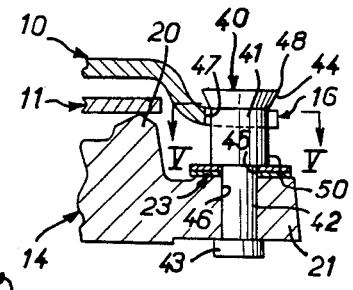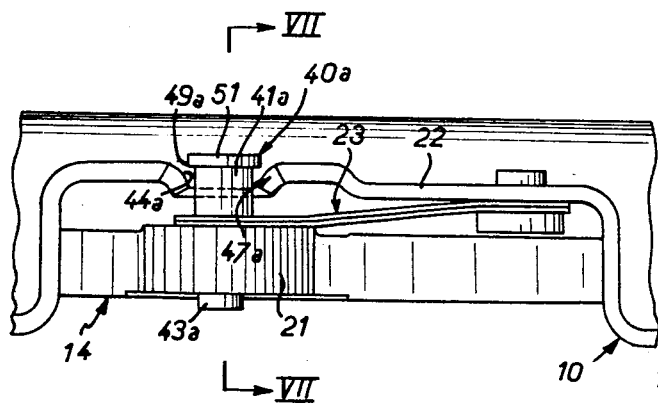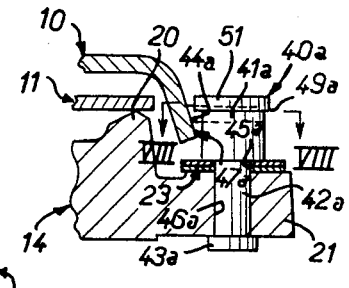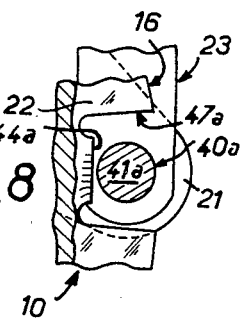

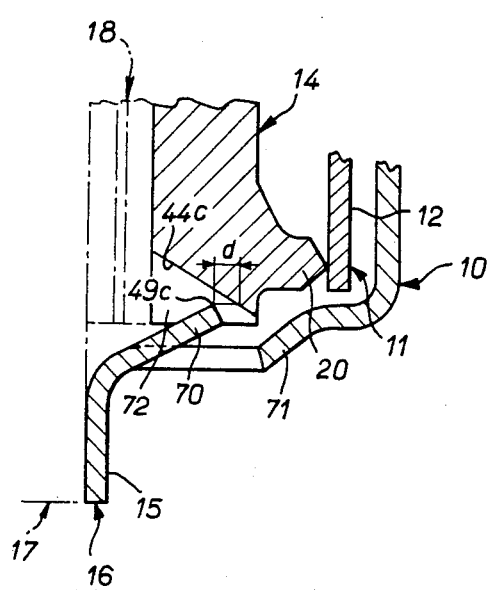
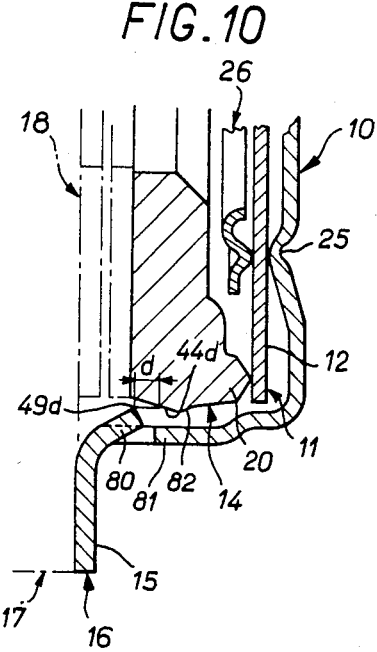
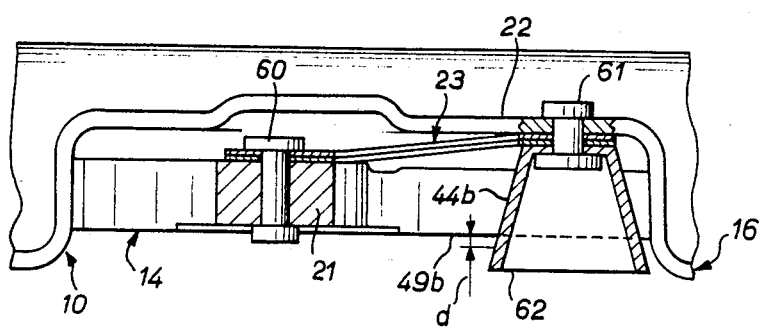
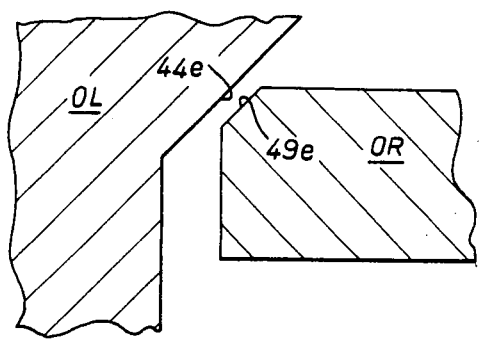

CLUTCH COVER ASSEMBLY

BACKGROUND OF THE INVENTION

1. Field of the Invention

The present invention concerns a clutch cover assembly suitable for automotive vehicles, of the kind comprising a pressure plate, elastic means (a diaphragm spring, for example) and cover.

The invention is more particularly concerned with means for limiting axial and radial movement of the pressure plate to prevent the driving straps which provide rotational linkage and axial mobility between the pressure plate and the cover being damaged when the pressure plate/diaphragm spring/cover combination is pre-assembled but not yet bolted to the reaction plate.

2. Description of the Prior Art

It is known that, following an impact to the edge of the pre-assembled mechanism in the storage position, caused by dropping it, for example, the pressure plate is acted on by axial and radial forces causing deformation of at least two of the straps, one in bending and the other in buckling. This occurs even in the presence of means for limiting axial movement of the pressure plate.

The means in question permit substantial bending of the straps caused by axial displacement resulting from the inertia of the plate. However, the known means, such as the pins disclosed in French Patent Application No. 867 177, cannot prevent certain kinds of deformation as a consequence of radial movement of said plate.

Since in the storage position said straps are in maximum bending, further bending through only a few tenths of a millimeter or buckling through only a few hundredths of a millimeter is likely to generate stresses prejudicial to the return force properties of the straps, as they exceed their elastic limit.

Such deformation can readily occur in spite of the presence of the aforementioned pins or any other means of limiting axial movement of the pressure plate.

These pins, which are in practice rigidly attached to the pressure plate, for example, must be capable of sliding without friction in a corresponding hole in the cover during manipulation or operation of the clutch. As is well known, there is in a clutch cover assembly a lack of parallelism between the friction surface of the pressure plate and the bead through which the diaphragm spring bears on the pressure plate. This causes slantwise positioning of the pressure plate on operation of the clutch. This lack of parallelism is accentuated once the mechanism is mounted, on the one hand by the diaphragm spring which is not flat, particularly in the region of its fingers, which causes distortion of the part forming the Belleville washer at the roots of the fingers of the diaphragm spring on operation of the clutch, and on the other hand by virtue of defects in the bearing engagement between the cover and the diaphragm spring.

Moreover, when the clutch is operated (released or engaged), the cover tends to deform due to variations in the force exerted by the diaphragm spring.

For these reasons, in the prior art, such as the aforementioned patent application, for example, relatively large clearance is provided between the pin limiting axial movement of the pressure plate and the hole in the cover, so that no friction arises in operation.

This clearance is not compatible with proper radial retention of the pressure plate in the stored state.

Furthermore, if friction occurs during operation, this can have damaging consequences for the straps. In the event of an impact, the pin may come into circumferential contact with the hole in the cover which, by reaction, may cause unacceptable buckling of the straps.

The assignees of the present applicant have already proposed (in U.S. patent application Ser. No. 348,073 of Feb. 11, 1982) means for radial retention of the pressure plate.

This means consist in a lug cut out from the skirt of the cover and which is curved so that it comes into opposed relationship with a circumferential notch formed in the edge of the pressure plate.

Radial clearance is provided between the lug and the bottom of the notch, so that friction in operation is entirely eliminated.

Unfortunately, this solution does not give satisfaction in all cases, and certain disadvantages may arise in implementing it.

First of all, even if the notch can be formed during casting, it must subsequently be machined on a lathe. Thus there is in any event an additional operation in the manufacture of the pressure plate.

In any case, the shape of the lug is not simple. It is relatively short, and it is necessary to observe precise bending dimensions, all the more so in that the radial clearance margin in the mechanism is extremely tight, for the reasons mentioned above.

Also, the pressure plate is mounted in the cover by means of a bayonet coupling type movement. To this end, it is therefore necessary to provide special assembly rigs and machinery capable of carrying out an axial movement and also a rotational movement. Assembly is thus considerably complicated and the cost further increased.

The objective of the present invention is to overcome these disadvantages and to provide axial limiting and retaining means permitting friction-free sliding of the pressure plate and radial retention of said plate with all risk of deterioration of the straps avoided.

SUMMARY OF THE INVENTION

The present invention consists in a clutch cover assembly comprising a pre-assembled combination of a part which is fixed in the axial direction, a part which is movable in the axial direction, elastic means acting on said axially movable part, means adapted to limit axial movement of said axially movable part, and means adapted to retain said axially movable part in the radial direction, said limiting and retaining means comprising at least one retaining member carried by a first of said parts and at least one limiting member carried by the second of said parts, said limiting member having at least one surface inclined relative to the axial direction and said retaining member having, opposite said inclined surface, at least one edge adapted to immobilize said axially movable part in a storage position by engagement with said surface.

With such an arrangement, in the storage position mutual engagement of the retaining and limiting members in the event of impact, for example, generates cohesion in the mechanism as a whole which eliminates any risk of damage to the straps.

On the other hand, there is sufficient radial clearance in operation between the limiting member and the retaining member so that no friction is generated during engagement and release of the clutch. The limiting member is naturally situated at an axial distance from the retaining member such that no contact between the two members is possible in operation. Thus the invention can satisfy both the previously mentioned and apparently mutually contradictory requirements.

During bolting of the mechanism onto the reaction plate, the members disengage from one another automatically without deterioration, whatever the degree of lack of parallelism and whatever the position of the pressure plate in the storage state. It will be realized that during this operation the radial distance between said members increases. The mounting of the mechanism on a reaction plate is thus facilitated.

It should also be noted that implementation of the present invention, in the case of at least certain embodiments, does not require substantial modification of the pressure plate or the cover or the method of assembling the mechanism.

In one embodiment of the clutch cover assembly the first part comprises a cover, the second part comprises a pressure plate, the elastic means comprise a diaphragm spring, the retaining member comprises an opening in the cover and the limiting member comprises a frusto-conical shoulder disposed above a pin which is adapted to slide without friction in the opening during normal operation of the mechanism, the shoulder being adapted to engage hookwise with the opening in the storage position.

These arrangements are particularly advantageous and may be implemented without significant transformation of ordinary type clutch cover assemblies.

In an assembly of this kind the prior art pins may be replaced by pins in accordance with the present invention which, by virtue of their frustoconical shoulder, are adapted to cooperate with the openings in which they slide. The engagement of each frusto-conical shoulder of the pins in the corresponding opening in the cover provides for immobilizing the pressure plate in both the axial and radial directions when in the storage state.

Other objects and advantages will appear from the following description of an example of the invention, when considered in connection with the accompanying drawings, and the novel features will be particularly pointed out in the appended claims.

BRIEF DESCRIPTION OF THE DRAWINGS

FIG. 1 is a view in elevation along the arrow I in FIG. 2 of the clutch cover assembly in accordance with the present invention.

FIG. 2 is a view of the clutch cover assembly in cross-section on the line II—II in FIG. 1.

FIG. 3 is a partial view of the clutch cover assembly along the arrow II in FIG. 1.

FIG. 4 is a view in cross-section on the line IV—IV in FIG. 3.

FIG. 5 is a partial cross-section through the assembly on the line V—V in FIG. 4.

FIG. 6 is a view corresponding to FIG. 3 and showing another embodiment of the assembly in accordance with the present invention.

FIG. 7 is a view in cross-section on the line VII—VII in FIG. 6.

FIG. 8 is a partial cross-section through the assembly on the line VIII—VIII in FIG. 7.

FIGS. 9 and 10 are partial views corresponding to FIG. 2 and showing two further embodiments of an assembly in accordance with the present invention.

FIG. 11 is a view corresponding to FIG. 3 of another embodiment of an assembly in accordance with the present invention.

FIG. 12 is a schematic view showing a variant of the above embodiments.

DESCRIPTION OF THE PREFERRED EMBODIMENTS

Figure 13:
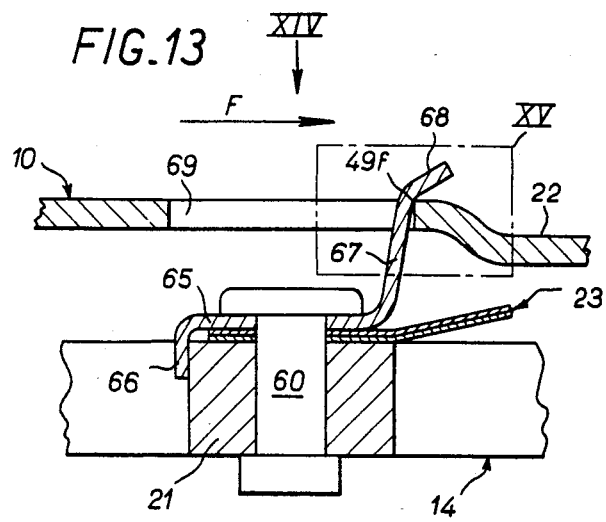
FIG. 13 is a partial view analogous to FIG. 11, showing a variant.

In the embodiment shown in FIGS. 1 to 5, the diaphragm spring clutch cover assembly in accordance with the invention generally comprises a first generally annular part or cover 10, a second generally annular part or diaphragm spring 11 which has a peripheral part 12 constituting a Belleville washer and a central part subdivided into radial fingers 13, assembly means pivotally connecting diaphragm spring 11 to cover 10 and described in detail hereinafter, and a third annular part or pressure plate 14 which is constrained to rotate with cover 10 while being movable relative thereto in the axial direction as will be specified hereinafter, and on which the peripheral part of diaphragm spring 11 constituting Belleville washer 12 bears. This combination of parts is generally pre-assembled and stored prior to final assembly.

Cover 10 has areas 15 on a peripheral radial rim 16 by virtue of which it is adapted to be mounted on a pressure plate or flywheel 17 shown schematically for purposes of illustration in chain-dotted line in FIG. 2 and which is constrained to rotate with a first shaft, in practice a driving shaft, with a friction disk 18 between reaction plate 17 and pressure plate 14. Friction disk 18 is also schematically represented in chain-dotted line in FIG. 2, and is constrained to rotate with a second shaft, in practice a driven shaft.

To permit action of diaphragm spring 11, pressure plate 14 has spaced axial bosses 20 on which bears the peripheral part of diaphragm spring 11 constituting Belleville washer 12.

The periphery of the pressure plate has spaced radially projecting lugs 21 from which and to areas 22 of peripheral rim 16 of cover 10 extend, substantially tangentially to a circumference of the assembly, drive straps 23 constraining it to rotate with cover 10 while permitting it to move in the axial direction (see FIG. 3). These straps are riveted to the cover and to the plate.

These arrangements are well known per se and as they do not constitute part of the present invention they will not be described in more detail here.

Cover 10 provides a first or primary support for diaphragm spring 11, more specifically for the peripheral part thereof constituting Belleville washer 12, at the internal periphery of this peripheral part. In the embodiment shown, it has to this end an annular half-wave-shaped deformation forming a first support ring 25 (FIG. 2).

The assembly means pivotally coupling diaphragm spring 11 to cover 10 comprise a fourth annular part or ring 26 providing a circular second or secondary support for diaphragm spring 11, on the side thereof opposite cover 10, having to this end in the embodiment shown, in line with half-wave-shaped deformation 25 of cover 10, a comparable half-wave-shaped deformation 27; it further comprises integral retaining lugs 28 which are flat and thin and by means of which it is coupled to cover 10. Each lug 28 passes through a respective opening 30 in diaphragm spring 11.

Retaining lugs 28, of which there are nine in this embodiment, are thus integral with ring 26, the combination being formed, for example, by appropriately bending and cutting a single blank.

Cover 10 has lugs 33 adapted to limit distension of diaphragm spring 11 between retaining lugs 28.

The combination of the four generally annular parts is generally pre-assembled and stored prior to mounting on the pressure plate.

There will now be described, with reference to FIGS. 2 to 5, one embodiment of the means for limiting and restraining axial and radial movement of the pressure plate, the description presupposing that the clutch cover assembly is in the pre-assembled state but not yet bolted to the reaction plate.

Each strap 23, consisting in this instance of a pair of thin plates, is riveted to lug 21 by means of a rivet 40 comprising a cyclindrical body or pin 41 extending in the axial direction and extended by a cylindrical part 42 of smaller diameter than body 41 and a head 43. Body 41 comprises a shoulder having a frustoconical surface 44 disposed above body 41.

Rivet 40 is inserted in a hole 45 in strap 23 and a hole 46 in lug 21. In the conventional manner, the head is formed by flattening a projecting part of cylindrical part 42 over lug 21, and constitutes the means whereby rivet 40 attaches lug 23 to plate 14.

Cylindrical body 41 passes through a notch 47 formed in the periphery of cover 10. The circumferential width of notch 47 is greater than the diameter of the largest diameter circular edge 48 of frustoconical shoulder 44. On the other hand, the bottom 49 of the notch is adapted to interfere with shoulder 44 in a withdrawn position. Notch bottom 49 is advantageously part-circular with the center of the circular arc on the axis of the clutch cover assembly.

When the clutch cover assembly is bolted to the reaction plate and in the engaged position, with the facings of friction disk 18 worn, frustoconical shoulder 44, constituting a limiting member, remains at a certain axial distance from bottom 49, forming a retaining member for notch 47, so that no contact is possible during functioning between this shoulder and said edge, due account being taken of manufacturing tolerances and the deformation to which the various parts constituting the clutch cover assembly are subject. The same is necessarily true of the cylindrical flank 50 of body 41 which is disposed, in operation, at a radial distance from the bottom of notch 47 such that no friction between body 41 and cover 10 is possible.

When the clutch cover assembly is in the stored state, for example in the case of replacement assemblies sold by retailers of spare parts, diaphragm spring 11 urges pressure plate 14 outwards. Shoulder 44 on each body 41 then preferably comes into abutment with the edge of the corresponding notch bottom 49. By virtue of the resulting cohesion, no axial or radial movement of the pressure plate is possible. Cohesion is simultaneously obtained by virtue of friction in the circumferential direction. The clutch cover assembly can then withstand all manner of impact without damage to the straps. It should be noted that the circumferential clearance between notch 47 and frustoconical shoulder 44 prevents any circumferential contact between notch 47 and the frustoconical shoulder in response to an impact, which could under certain circumstances result in unacceptable buckling of the straps.

It should be noted that the implementation of this means of limiting and restraining axial and radial movement of the pressure plate may be applied without substantial modification to certain existing clutch cover assemblies. In certain prior art assemblies body 41 is surmounted by a cylindrical shoulder. The function of this shoulder is to limit axial movement of the pressure plate but it is incapable of limiting a radial displacement of the pressure plate of the order of a few hundredths of a millimeter. In accordance with the present invention, by virtue of its frustoconical shoulder 44, rivet 40 is capable of limiting such movement while also constituting effective means of limiting axial movement of the pressure plate. The adaptation of this means to the prior art assemblies can be effected at very low cost since it is merely necessary to replace the rivets having a cylindrical shoulder with rivets in accordance with the present invention, and to provide the cut-out in notches 47.

It should also be noted that when the clutch cover assembly in accordance with the present invention is bolted to the reaction plate, the pressure plate moves and frustoconical shoulder 44 are automatically disengaged from notch bottoms 49, without deterioration and irrespective of any lack of parallelism or the position of the pressure plate in the storage state. It will be realized that, in this as in the other variants, when the assembly is bolted to the reaction plate the radial clearance between the limiting member and the retaining member increases.

MODIFICATIONS

There will now be described with reference to FIGS. 6 to 8 another embodiment of the clutch cover assembly in accordance with the present invention, with certain similar component parts having the same reference numerals with the suffix a.

In this embodiment, each strap 23 is also riveted on by means of a rivet 40a comprising a cylindrical body or pin 41a, a second cylindrical part 42a and a head 43a.

In this embodiment, body 41a is surmounted by a cylindrical shoulder 51 comprising a bottom circular edge 49a the diameter of which is substantially greater than that of body 41a.

Body 41a passes through a notch or opening 47a in cover 10.

Each notch 47a is obtained by stamping out the appropriate region of cover 10 situated in line with hole 46a in lug 21. The purpose of such stamping is to form in the bottom of notch 47a a surface 44a which is inclined relative to the axial direction.

As previously, the circumferential width of notch 47a is greater than the diameter of edge 49a and, in operation, edge 49a of cylindrical shoulder 51 is always at an axial distance from surface 44a such that any contact between these two parts is impossible. The same necessarily applies in the radial direction.

On the other hand, in the stored state, each edge 49a of shoulder 51 is in abutment with the corresponding surface 44a, thus preventing any accidental axial or radial movement of the pressure plate.

It should be noted that there is again, in this instance, automatic disengagement of the retaining members (edge 49a of shoulders 51) and limiting members (surfaces 44a) on bolting of the clutch cover assembly in accordance with the present invention onto the reaction plate.

Likewise, it will be noted that the cover is only slightly modified as compared with those of the prior art, while it is feasible to retain the rivets already acting to limit axial movement only of the pressure plate.

There will now be described with reference to FIGS. 9 and 10 another embodiment of a clutch cover assembly in accordance with the invention.

FIGS. 9 and 10 are partial views corresponding to part of FIG. 2. Parts common to the three figures have the same reference numerals and will not be described again.

In FIG. 9, the retaining member consists of edges 49c of inclined lugs 70 cut out from the peripheral skirt 70 of cover 10. The limiting member corresponding to each of the retaining members consists of a surface 44c inclined to the axial direction and a cut-out 72 in the pressure plate in line with lugs 70.

In FIG. 10, pressure plate 14 comprises, on its outside edge surface 82, a frustoconical surface 44d constituting the limiting member which cooperates with spaced lugs 80 cut out from the skirt 81 of cover 10, having an edge 49d constituting the retaining member.

The foregoing arrangements are of particular advantage when there is a requirement not to use neighboring regions of the drive straps for the provision of the retaining and limiting members.

It should be noted that once again there is a distance d between edge 49c and surface 44c (49d, 44d) to prevent any contact between the pressure plate and the cover in normal operation.

In the stored state, there is cooperation between surface 44c and edge 49c (49d, 44d) such that the pressure plate is immobilized.

It should also be noted that automatic disengagement without deterioration of the limiting and retaining members occurs when the cover assembly is bolted to the reaction plate.

There will now be described with reference to FIG. 11 a further embodiment of the clutch cover assembly in accordance with the present invention.

Straps 23 are riveted in the conventional manner to lugs 21 of pressure plate 14 by means of a rivet 60 and to cover 10 by means of a rivet 61.

In accordance with the invention, a cup 62 habing an external frustoconical surface 44b inclined to the axial direction is riveted by means of rivet 61 to the cover, in the vicinity of each lug 21. When the cover assembly is in the engaged position, with the facings of friction disk 18 worn, as shown in FIG. 11, there is is a distance d between an edge 49b of the circular outside edge surface of the pressure plate (centered on the axis of the assembly) and surface 44b. There is naturally radial separation between edge 49b and surface 44b.

In the stored state, edge 49b comes into contact with the corresponding surface 44b. In this instance, it is cup 62, and in particular its surface 44b, which forms the limiting member whereas the edge surface of the pressure plate, and more particularly its edge 49b, forms the retaining member.

Once again there is no friction between the pressure plate and the limiting members since there is a minimum axial distance d between edge 49b and surface 44b, this distance d naturally allowing for manufacturing tolerances for the various parts and for their deformation in operation.

There is also, in this embodiment, automatic disengagement of the cups after bolting to the pressure plate.

It should also be noted that no modification of the various parts is necessary, nor is there any need for a special projection on the pressure plate, rough machining being sufficient.

The shape of cups 62 may naturally be adapted to various requirements and thus not necessarily frustoconical.

In accordance with the present invention, however, they must have an inclined limiting surface in the vicinity of a retaining edge.

Note also that while, in the embodiment shown in FIG. 11, the cup is riveted to the cover and cooperates with an edge rigidly attached to the pressure plate, there is nothing to prevent it being riveted to a radial projection on the pressure plate and cooperating with an appropriate edge on the cover.

Before further embodiments are described, there are a number of points worthy of note. Firstly, the retaining member (OR) which is described hereinabove as having "at least one edge" may equally well comprise a surface (49e, FIG. 12) of greater or lesser width to cooperate with inclined surface 44e of the limiting member (OL).

It should also be noted that in the embodiments shown in FIGS. 1 to 11 the inclined surface 44, 44a, ... 44d are either flat or frustoconical and that, in the latter case, it is a straight generatrix of each surface which comes into contact with an edge 49, 49a, ... 49d.

In accordance with the invention, it is necessary that the edge and the surface cooperate to immobilize the pressure plate. Given this principle, it is sufficient that the surface and the edge have the appropriate geometry.

Thus, for example, the surface may be concave and the edge rounded.

Figure 14:
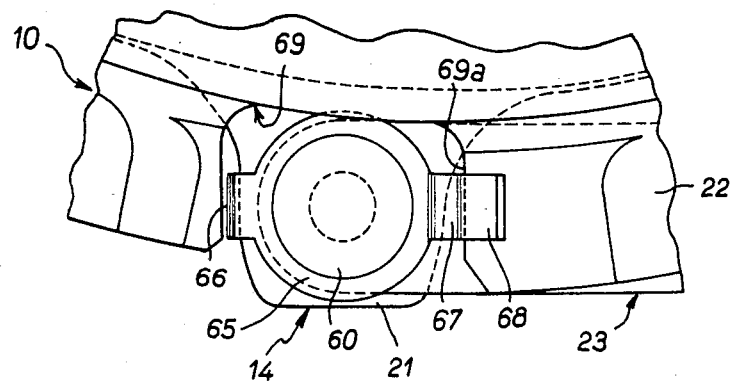
FIG. 14 is a view along the arrow XIV in FIG. 13.

There will now be described, with reference to FIGS. 13 to 15, a further embodiment in which the limiting member is rigidly attached to the pressure plate and cooperates with an appropriate edge formed on the cover.

A limiting part 65 rigidly attached to lug 21 and strap 23 by rivet 60 has two diametrically opposed arms, a rotation blocking arm 66 and an arm comprising two inclined parts 67, 68. At the junction of arm parts 67, 68 and forming a limiting member (FIG. 15) is an inclined concave surface 44f. Note that part 68 is inclined relative to part 67.

Surface 44f is adapted to cooperate with a generally radial lateral edge 49f of a notch 69 formed in the cover for the purpose of riveting on the strap. Edge 49f is situated on the side defined by the arrow F corresponding to the normal direction of rotation of the clutch cover assembly, so that in the position of contact between edge 49f and surface 44f, strap 23 is loaded in tension. In other words, restraining edge 49f is on the downstream side of rivet 60 in the normal direction of rotation. Note also that when contact between edge 49f and surface 44f ceases, the clearance betweeen arms 67, 68 increased by virtue of the inclination of arm 67.

Figure 15:
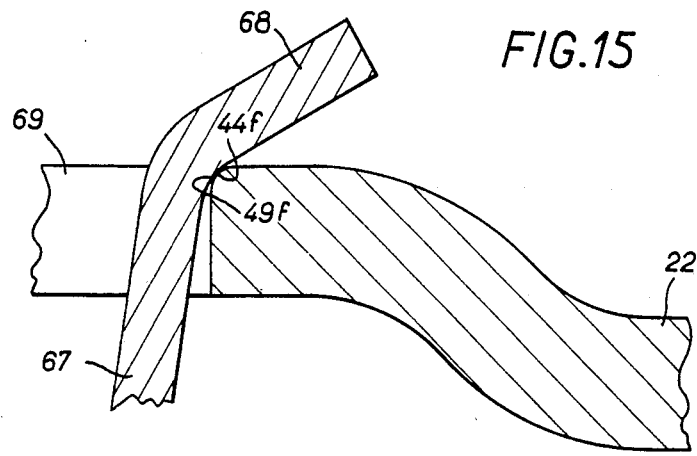
FIG. 15 is an enlargement of that part of FIG. 13 marked XV.

Note that in this embodiment, edge 49f is substantially rounded (FIG. 15).

In a variant of this embodiment, the inclined limiting surface could be formed by a bent portion of the edge of notch 69 adapted to cooperate with a retaining member formed by an edge of arm 68, bent at a right-angle, for example.

It will be understood that various changes in the details, materials and arrangements of parts, which have been herein described and illustrated in order to explain the nature of the invention, may be made by those skilled in the art within the principle and scope of the invention as expressed in the appended claims. For example, in FIG. 13 edge 49f could cooperate with part 68. The invention is applicable in particular to "pull" type clutches. Insofar as the elastic means are concerned, these may consist of coil springs instead of a diaphragm spring.

Circumferential cohesion known per se in the axial and radial directions is implemented, either by friction or by clamping, in all the variants described.

Note that the number of limiting and retaining members may be varied as appropriate to the various embodiments of the clutch cover assembly. For example, in the embodiment shown in FIGS. 1 to 5, three limiting members 40 are rigidly attached to the pressure plate.

It will be obvious that the number of limiting members associated with each clutch cover assembly depends on its configuration. To ensure proper retention of the pressure plate, it is always necessary to provide more than one limiting member.

I claim:

1. A clutch cover assembly comprising an axially fixed part, an axially movable part, means mounting said axially movable part for axial movement relative to said axially fixed part and for rotational movement with said axially fixed part, elastic means for urging said axially movable part toward a storage position, means for limiting axial movement of said axially movable part and for retaining said axially movable part in the radial direction, said mean for limiting and for retaining defining the storage position for said axially movable part comprising at least one retaining member carried by a first of said parts and at least one limiting member carried by a second of said parts, said limiting and retaining members being out of frictional contact in the operative position of said clutch cover assembly, said limiting member having at least one surface inclined relative to the axial direction and said retaining member having at least an edge engageable with said inclined surface in the storage position to prevent the movement of said axially movable part in the radial and axial directions.

2. A clutch cover assembly according to claim 1, wherein said first part comprises a cover, said second part comprises a pressure plate, said elastic means comprise a diaphragm spring, said retaining member comprises means defining an opening in said cover, said limiting member comprises a frustoconical shoulder above a pin adapted to move without friction in said opening and to abut means defining an opening in said storage position.

3. A clutch cover assembly according to claim 2, wherein said means mounting said axially movable part for axial movement relative to said axially fixed part and for rotational movement with said axially fixed part comprises at least one drive strap, a rivet attaching said strap to said pressure plate, said pin being integral with said rivet.

4. A clutch cover assembly according to claim 2, wherein said means defining an opening comprises a notch in the periphery of said cover.

5. A clutch cover assembly according to claim 4, wherein said retaining member is a bight portion of said notch.

6. A clutch cover assembly according to claim 4, wherein the width of said notch in the circumferential direction is greater than the diameter of the larger diameter circular edge of said frustoconical shoulder.

7. A clutch cover assembly according to claim 4, wherein said retaining member comprises a generally radial edge of said slot.

8. A clutch cover assembly according to claim 4, wherein said retaining member comprises a generally radial edge of said slot.

9. A clutch cover assembly according to claim 1, wherein said first part comprises a cover, said second part comprises a pressure plate, said elastic means comprise a diaphragm spring, said retaining member comprises at least one inclined lug cut out from the periphery of said cover and said limiting member comprises at least one inclined cut-out in said pressure plate, in line with said lugs.

10. A clutch cover assembly according to claim 1, wherein said first part comprises a cover, said second part comprises a pressure plate, said elastic means comprise a diaphragm spring, at least part of the outside edge of said pressure plate is frustoconical and said retaining member comprises at least one lug cut out from the periphery of said cover.

11. A clutch cover assembly according to claim 1, wherein said first part comprises a pressure plate, said second part comprises a cover, said elastic means comprise a diaphragm spring, said retaining member comprises a cylindrical shoulder above a pin and said limiting member comprises an inclined surface bordering an opening, said pin being adapted to move without friction in said opening and said shoulder being adapted to abut said surface in said storage position.

12. A clutch cover assembly according to claim 11, wherein said opening comprises a notch in the periphery of said cover and said inclined surface borders a bight portion of said notch.

13. A clutch cover assembly according to claim 11, wherein said means mounting said axially movable part for axial movement relative to said axially fixed part and for rotational movement with said axially fixed part comprising at least one drive strap and a rivet attaching said strap, and wherein said pin is an integral part of said rivet.

14. A clutch cover assembly according to claim 13, wherein the width of said notch in the circumferential direction is greater than the diameter of said cylindrical shoulder.

15. A clutch cover assembly according to claim 1, wherein said first part comprises a pressure plate, said second part comprises a cover, said elastic means comprise a diaphragm spring, said limiting member comprises a cup and said cup has at least one inclined surface.

16. A clutch cover assembly according to claim 15, wherein said cup is frustoconical.

17. A clutch cover assembly according to claim 16, wherein said retaining member comprises an edge of the outside edge surface of said pressure plate.

18. A clutch cover assembly according to claim 1, wherein one of said inclined surface and said edge comprises a surface of revolution.

19. A clutch cover assembly according to claim 1, wherein one of said inclined surface and said edge is curved and the other of said inclined surface and said edge is straight, and said edge and said inclined surface are tangent to each other when in abutment in said storage position.

20. A clutch cover assembly according to claim 1, wherein said limiting member and said retaining member are out of circumferential engagement even in said storage positsion.

21. A clutch cover assembly according to claim 1, wherein said inclined surface comprises a frustoconical surface and said edge extends generally chordally of the axis of said cover assembly.

22. A clutch cover assembly according to claim 21, wherein said limiting member comprises a frustoconical head on an axially extending pin for fixing said means mounting said axially movable part for axial movement relative to said axially fixed part and for rotational movement with said axially fixed part and said edge is a bight portion of a cutout, said pin being received in said cutout for relative axial movement.

23. A clutch cover assembly according to claim 1, wherein said inclined surface is generally flat and said edge is generally at least part circular.

24. A clutch cover assembly according to claim 1, wherein said limiting member comprises an inclined tab and said retaining member, a curved shoulder on an axially extending pin for fixing said means mounting said axially movable part for axial movement relative to said axially fixed part and for rotational movement with said axially fixed part.

25. A clutch cover assembly according to claim 24, wherein said tab is circumferentially flanked by substantially radial edges circumferentially out of contact with said pin even in said cover storage position.

26. A clutch cover assembly according to claim 1, wherein said limiting member comprises a frustoconical surface of a frustoconical cup and said edge is formed by a portion of the circumference of said axially movable part.

27. A clutch cover assembly according to claim 1, wherein said inclined surface is provided on said axially movable part and converges towards the axis away from said fixed part and said edge is a chordally extending edge formed on an inclined lug of said axially fixed part.

28. A clutch cover assembly according to claim 1, wherein said means mounting said axially movable part for axial movement relative to said axially fixed part and for rotational movement with said axially fixed part comprises straps fixed to said parts, said straps means acting in tension when said retaining and limiting members abut.

29. A clutch cover assembly comprising a pre-assembled combination of a part which is fixed in the axial direction, a part which is movable in the axial direction, elastic means acting on said axially movable part, means adapted to limit axial movement of said axially movable part, and means adapted to retain said axially movable part in the radial direction, said limiting and retaining means comprising at least one retaining member carried by a first of said parts and at least one limiting member carried by the second of said parts, said limiting member having at least one surface inclined relative to the axial direction and said retaining member having, opposite said inclined surface, at least one edge adapted to immobilize said axially movable part in a storage position by engagement with said surface, said first part comprising a cover, said elastic means comprising a diaphragm spring, said retaining member comprising a cylindrical shoulder above a pin and said limiting member comprising an inclined surface bordering an opening, said pin being adapted to slide without friction in said opening and said shoulder being adapted to engage hookwise with said surface in said storage position.

30. A clutch cover assembly according to claim 29, wherein said opening comprises a notch in the periphery of said cover and said inclined surface borders the bottom of said notch.

31. A clutch cover assembly according to claim 29, further comprising at least one drive strap and a rivet attaching said strap, and wherein said pin is an integral part of said rivet.

32. A clutch cover assembly according to claim 31, wherein the width of said notch in the circumferential direction is greater than the diameter of said cylindrical shoulder.

* * * * *